US012233330B2

(12) United States Patent  (10) Patent No.: US 12,233,330 B2
Greenberg et al.  (45) Date of Patent: *Feb. 25, 2025

(54) RACQUET SPORT SCORING SYSTEM

(71) Applicants: Mark Greenberg, Boston, MA (US); Michael LaPierre, Beverly, MA (US)

(72) Inventors: Mark Greenberg, Boston, MA (US); Michael LaPierre, Beverly, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,927

(22) Filed: Sep. 25, 2023

(65) Prior Publication Data

US 2024/0009544 A1    Jan. 11, 2024

Related U.S. Application Data

(63) Continuation-in-part of application No. 16/879,044, filed on May 20, 2020, now Pat. No. 11,801,434.

(51) Int. Cl.
*A63B 71/06* (2006.01)
*G06F 3/01* (2006.01)
*A63B 102/02* (2015.01)

(52) U.S. Cl.
CPC .......... *A63B 71/0669* (2013.01); *G06F 3/017* (2013.01); *A63B 2102/02* (2015.10); *A63B 2225/20* (2013.01)

(58) Field of Classification Search
CPC ...... A63B 2071/063; A63B 2071/0658; A63B 2071/0675; A63B 2071/0683; A63B 2071/0694; A63B 2102/02; A63B 2220/806; A63B 2225/20; A63B 61/003; A63B 71/0622; A63B 71/0669

See application file for complete search history.

(56) References Cited

U.S. PATENT DOCUMENTS

| | | | |
|---|---|---|---|
| 4,097,855 | A | 6/1978 | Salvo |
| 6,012,995 | A | 1/2000 | Martin |
| 6,270,431 | B1 | 8/2001 | Martin |
| 6,980,113 | B1 | 12/2005 | Uehran |
| 7,361,083 | B2 | 4/2008 | Valero Moreno |
| 7,773,461 | B1 | 8/2010 | Crosby, Sr. |
| 8,882,613 | B2 | 11/2014 | Zuger |
| 10,413,824 | B2 | 9/2019 | Ramachandran |
| 11,801,434 | B2 * | 10/2023 | Greenberg ................ G06F 3/01 |
| 2007/0265719 | A1 | 11/2007 | Harding |
| 2012/0256373 | A1 | 10/2012 | Tam |

(Continued)

FOREIGN PATENT DOCUMENTS

| | | |
|---|---|---|
| DE | 102004010966 | 9/2005 |
| KR | 10-1723939 | 4/2017 |

(Continued)

*Primary Examiner* — Dmitriy Bolotin
(74) *Attorney, Agent, or Firm* — Lambert Shortell & Connaughton; David J. Connaughton, Jr.; Justin P. Tinger

(57) ABSTRACT

A racquet sports scoring system is provided. The scoring system uses a computerized display and input system to receive scoring changes. In many embodiments, the computerized interface is in communication with a database which records the score in real time, and also records scores of other concurrently-played matches. These match scores, and in some cases video of live matches played at other locations, can be viewed on the same computerized interface on which scores are recorded or on remote devices.

16 Claims, 7 Drawing Sheets

(56) References Cited

U.S. PATENT DOCUMENTS

| | | | |
|---|---|---|---|
| 2014/0163990 A1 | 6/2014 | Street | |
| 2016/0008660 A1 | 1/2016 | Thurman et al. | |
| 2016/0030829 A1 | 2/2016 | Rowsey | |
| 2016/0101358 A1 | 4/2016 | Ibrahim et al. | |
| 2016/0214008 A1* | 7/2016 | Heck | A63F 13/828 |
| 2016/0354664 A1 | 12/2016 | DeCarlo | |
| 2017/0050103 A1 | 4/2017 | Johnson | |
| 2018/0330824 A1* | 11/2018 | Athey | G16B 40/00 |
| 2021/0263901 A1 | 8/2021 | Barthel et al. | |
| 2023/0196770 A1 | 6/2023 | Anton et al. | |
| 2023/0260552 A1 | 8/2023 | Bose et al. | |

FOREIGN PATENT DOCUMENTS

| | | |
|---|---|---|
| KR | 10-2039123 | 9/2019 |
| WO | 2014123333 | 8/2014 |
| WO | 2016101021 | 6/2016 |

* cited by examiner

RACQUET SPORT SCORING SYSTEM

BACKGROUND OF THE INVENTION

Field of the Invention

The present invention relates generally to a computerized racquet sport scoring system. More particularly the present invention relates to a scoring system implemented on a tennis or similar court to provide efficient scoring, as well as live video and score updates of other local and/or remote tennis matches.

Description of Related Art

Traditional tennis scoring, especially at an amateur level, is typically tracked using simple flip score cards. This is a simple method, but its manual nature prevents the dissemination of live scores electronically, which makes remote tracking of scores nearly impossible. In addition, the manual scoring systems require more cumbersome tracking activities including manual entry and recording of scores, team scores, player information, and the like.

Moreover, many amateur tennis leagues are often based on multiple matches being played at the same time. None of the current art allows viewing of multiple matches with respect to score and then more directed focus on a match of interest. Remote real-time viewing of multiple matches is not an option in the prior art. Further still, in such cases, many times players in one match wish to see how other teammates are doing. It would be advantageous for them to be able to view scores and matches remotely.

The prior art has sought to solve these problems, but the so called solutions have many drawbacks. They include increasing the players' focus on complex scoring systems, rather than the mostly passive simple manual tracking. Since indoor tennis, and often outdoor tennis are timed events, the impact of delay is significant to the flow of the game. Further, complex hardware solutions are often contemplated which makes adoption difficult. Even further, the prior art does not allow for the pre-entering of player and match information into a computerized system, which currently is manually entered, which requires inefficient set up time, at best.

Therefore, what is needed is an efficient and easy-to-use electronic racquet sport scoring system.

SUMMARY OF THE INVENTION

The subject matter of this application may involve, in some cases, interrelated products, alternative solutions to a particular problem, and/or a plurality of different uses of a single system or article.

In one aspect, computerized racquet-sports scoring system is disclosed. The system utilizes a computer comprising a processor and a memory, and a display in communication with the processor. The computer is operable to receive inputs and provide outputs to track the scoring of the racquet sport match. In this aspect, the computer is operable to receive an input to increase a score of one of two players, wherein the receipt of the input is performed by a gesture input over a predetermined area of the display screen marked with an increase indicator. The computer may then cause the user interface presented on the display screen to increase a score displayed corresponding to the one of the two players the increased score is displayed on a first side of the screen, while a score of the other of the two players is displayed on a second opposite side of the screen. The computer may be further operable to receive an input to decrease a score of the one of two players, wherein the receipt of the input is performed by a gesture input over a predetermined area of the user interface presented on the display screen marked with a decrease indicator. The computer may then cause the display screen to decrease a score displayed corresponding to the one of the two players.

The computer may receive an input to increase a set win field of the one of two players. This input is performed by a gesture input, such as a touch screen gesture, mouse click, pushing a function key or button, an input to a smart watch which is in communication with the computer, direct entry of data, or the like, over a predetermined area of the user interface presented on the display screen marked with a set win increase indicator. The computer may then cause the display screen to increase a set win score displayed corresponding to the one of the two players, with the set win score being positioned on a same side half of the screen as the player score. Increasing the number of sets won automatically reduces the game scores on both sides to 0. The computer may be operable to receive an input to decrease the set win field of the one of two players, wherein the receipt of the input is performed by a gesture input over a predetermined area of the user interface presented on the display screen marked with a set win decrease indicator. Upon receipt of this input, the computer may cause the display screen to decrease the set win score displayed corresponding to the one of the two players.

The computer may further receive an input to switch score sides, wherein the receipt of the input is performed by a gesture input over a predetermined area of the user interface of the display screen marked with a side switching indicator. The computer may then cause the display screen to move the score of the first of the two players to the second side of the screen and move the score of the second of the two players to the first side of the screen.

Further still, the computer of the scoring system is operable to receive an input to cause the display screen to present scores of other matches being played. This input causes the computer to access a networked database comprising data relating to a plurality of scores of other racquet sports matches currently being played. The computer further causes the display screen to present a plurality of scores of these other matches. The presentation being by at least one of an overlay of the plurality of scores over at least part of the score of at least one of the two players and by shrinking and shifting the display of the scores of the two players.

In other aspects, a tennis court is provided which comprises the scoring system configured for a tennis scoring system. The scoring system interface (such as a tablet computer) may be positioned adjacent to the court on a table, wall, post, post supporting the net, and the like. In still other aspects, a tennis complex is provided comprising a plurality of tennis courts, each of which comprises the scoring system configured as a tennis scoring system.

DETAILED DESCRIPTION

Figure 1:
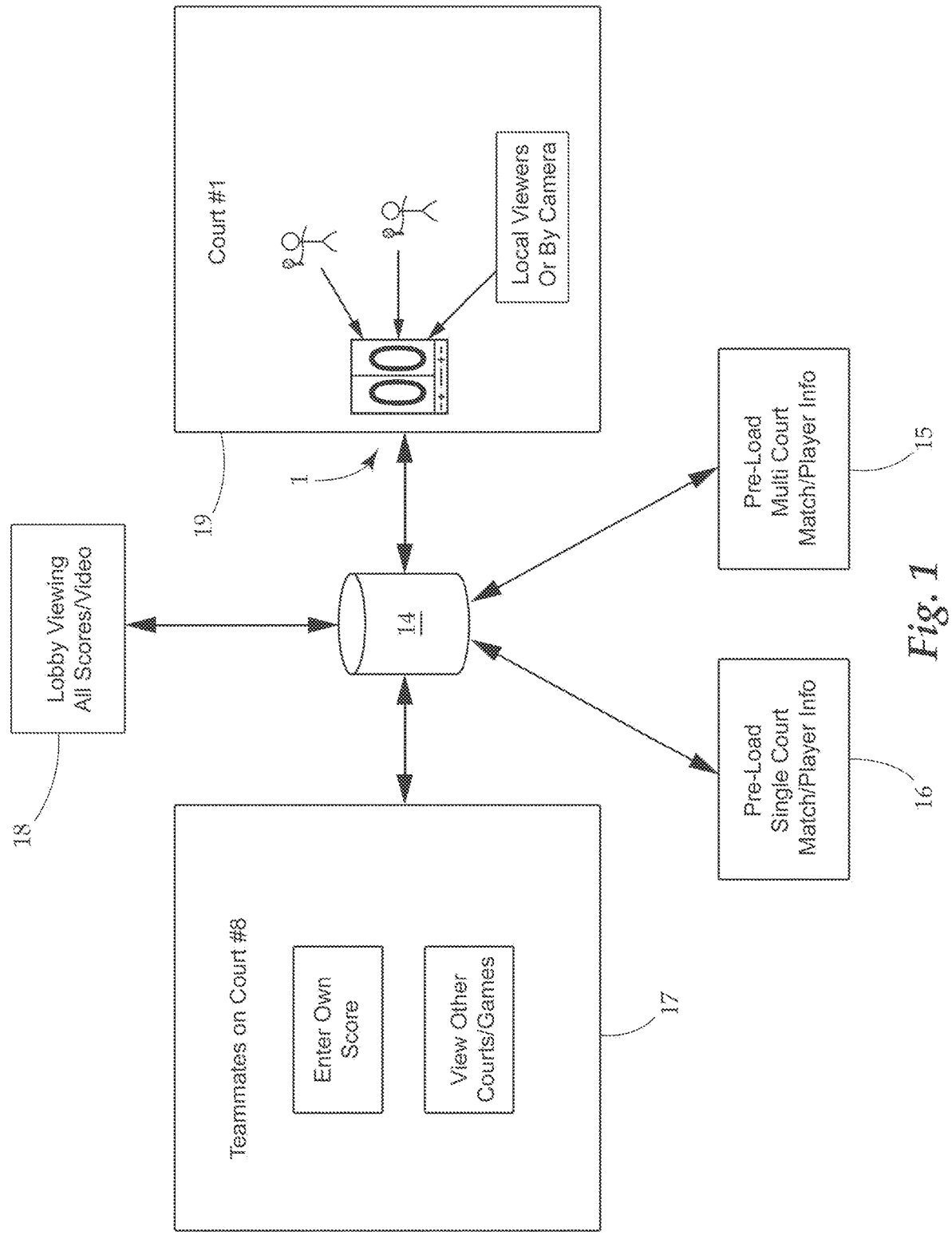
FIG. 1 provides a schematic view of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Tennis, as with other racquet sports, is often a team event, where the winner is based on an individual match score as well as other scores on other courts which may or may not be visible to the players on the first court. Therefore, there is often an interest in what the score is with respect to particular matches which could be playing at multiple locations at a single site, or at multiple sites. The interest is shared with people actually on the court at the time, teammates watching multiple matches, or internal/external people simply interested in the outcome. Understanding the score of competitors in a league occurring at a separate location, or one's child/grandchild playing across the country at school or in a tournament is often not possible. Today, for example, the primary means of tracking score is flipping the tennis cards adjacent to the court (or in a second common method, placing an older tennis ball by the game score to signify the current score). Most of the prior art relating to input devices on the racquet or wrist attached to an electronic score board have not been implemented in tennis. These methods work for only those people on site, and in direct view of the court—or watching the match as part of closed circuit or viewing arrangement.

Generally, the present invention integrates a computerized score tracking function accompanied by the capture of simple information about the match, and enable proper dissemination of scores electronically to other networked computers. Capturing the names of the players, some match identification, and the current score in sets and games allows the information to be viewed from afar. It also allows the multiple matches involved in a single competition to be viewed in a single view on a computerized display screen. Understanding which event is of interest also allows for the introduction of video (if the court is camera enabled) for a closer watch. A real time database or databases allow all viewers to see an up to date status of the overall situation. While the scoring system is generally discussed herein as applied to the sport of tennis, it should be understood that any racquet sport or other sport/game score may be tracked with the scoring system disclosed herein. In addition, where Player 1 or Player 2 is described could refer to doubles team 1 or doubles team 2, or the appropriate teams based on the sport. In other words, the scoring system may be used for multi-player or individual games. As disclosed herein, it should be understood that the terms relating to "player" may also refer to doubles game teams or other multi-player embodiments.

The present scoring system is integrated with the playing activity such that the effort to capture the information is less than or equal to the old effort of using flip cards, while providing information on the score to be widely transmitted. The scoring system of the present disclosure has multiple aspects, including but not limited to capturing information about the players and current score in games and sets, and updating a database and display in real time; allowing other players on other courts (including but not limited to non-visual locations) to see the scores on all of the courts or selected courts; allowing the scores and real-time video of the matches to be viewed remotely; pre-loading player and match information prior to beginning play to limit courtside administrative activities; and/or pre-loading full scheduled matches with respect to match information and players in advance of the league matches beginning. In one embodiment, an emergency button or screen area is defined on the user interface which may automatically alert staff or authorities that there is an emergency such as an injury or other urgent requirement. This alerting may be performed via networked data connection or separate cellular or wired telephone line connection. A signal with the court number and location may be automatically sent in one embodiment. In another embodiment, an audio or video conference connection may be initiated with one or more of an administrator and/or a first responder authority. In further embodiments, both a signal with required information as well as a voice or video connection may be employed.

In most embodiments of the present disclosure, a computer having a computerized data processor controls the scoring and other operations of the scoring system. The operation, user interface, and networked features may be a programmed module, such as an instruction set executable by a data processor, stored in a memory. The computer may be further configured to receive inputs from the user interface, and provide output through at least a display screen. In one embodiment, the display may be a touch screen, such that it also may receive inputs such as those noted above. Such electronic versions of the present invention may be implemented on various computerized devices including, but not limited to, a computerized implementation on a computer such as a tablet, smartphone, smart watch, kiosk, desktop or laptop computer, as well as network based embodiments, internet embodiments, or application embodiments.

In further detail, an embodiment of the scoring system contemplated herein may comprise a data processor. The processor may be in communication with a display, a user interface, as described herein, and a memory device. The memory device may contain the operational programming, as well as electronic representations of the related graphics and layout, for presentation by the display. The memory may further contain program instructions. These instructions are executable by the data processor to conduct the steps of the scoring operation, tracking, video viewing, and the like, as will be detailed below.

One aspect of the invention may also include a non-transitory computer readable medium having instructions allowing and instructing the data processor to carry out the steps required, as described herein. This non-transitory computer readable medium may be stored within the housing of the entertainment machine, or may be accessible through an electronic communication system such as a network and/or internet connection.

Turning now to FIG. 1, an embodiment of the system is shown. A centralized and real-time database 14 is in communication with multiple different components which provides access to score information and video of the games being played. A first court 19 has two players both of whom can update their scores using the scoring system 1. As the scores are updated, data is sent to a database 14 on a memory of a server which updates the score, recording score information on the database stored on a memory of the server, the server in networked communication with a plurality of scoring systems and other access computers. The scoring system 1, in this embodiment, also has the ability to receive scores from other matches at other court locations. This is achieved by receiving information by the scoring system 1 from the database 14 via a networked connection. Additional operational details of the scoring system 1 are discussed below. The database 14 also allows others, via computerized networked communication, to view the score updates of the score and optionally video on court #1. For example, in a lobby of a tennis club 18, a computer accessing the database 14 can display scores and/or video of the game play. Similarly, on a separate court 17 players can enter their own score on a scoring system 1 and can also view scores and/or video from other courts and games. The database 14 also allows pre-loading of single court match and player info 16, including player name and team, and schedule of matches with each player for each match listed. Moreover, the database 14 allows for pre-loading of multi-court match and player info 15 which allows preprogramming of all of a tournament's players court locations, court schedules, team information, schedules, and the like.

Figure 2:
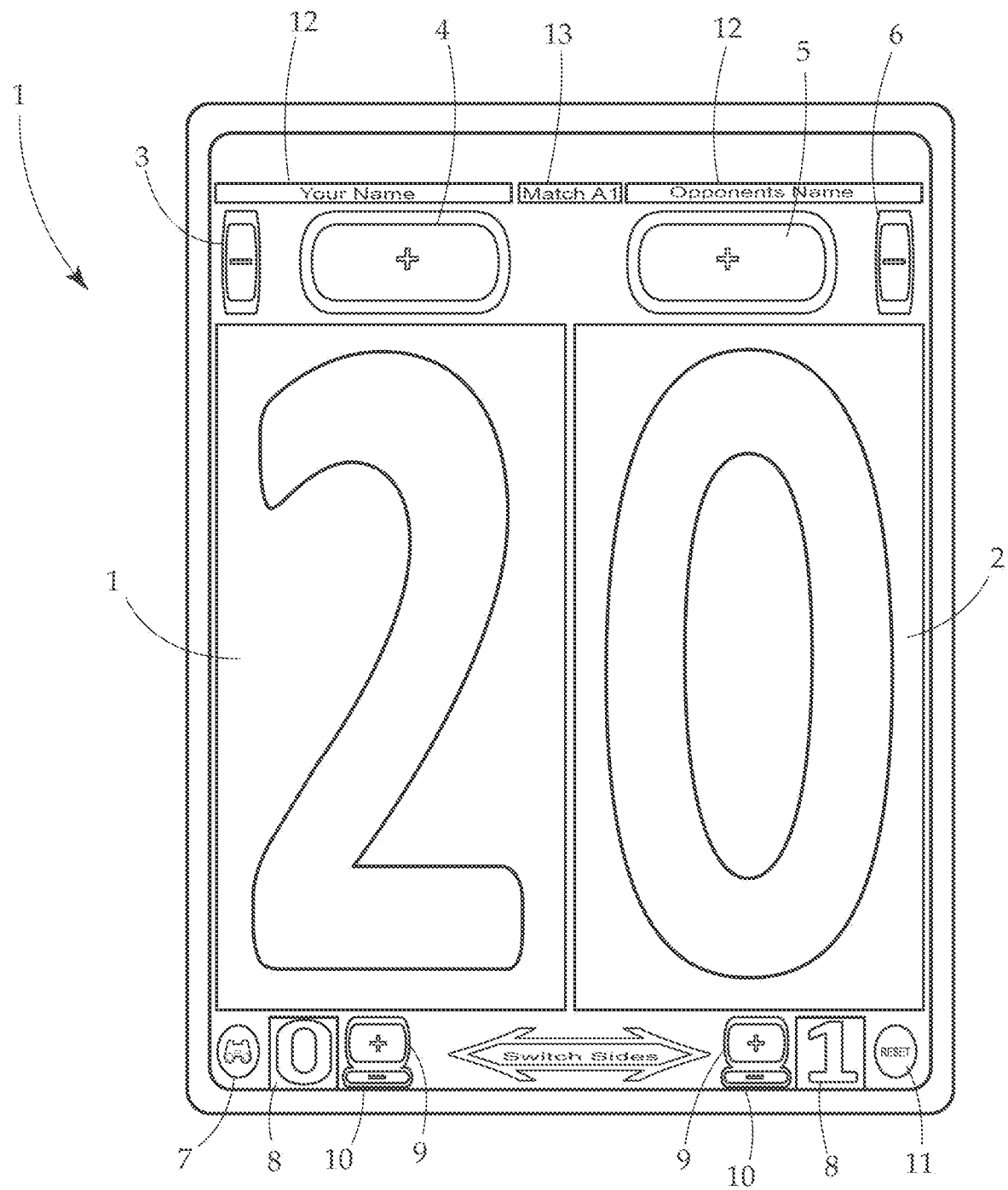
FIG. 2 provides a view of the scoring system user interface of the present invention.

FIG. 2 provides a view of a user interface of the racquet sports scoring system. In this view, the scoring system tracks a number of games and sets won by each player. As can be seen, first player 2A has won two games while second player 2B has won zero. The score of the first player 2A is on one side of a screen, while the score of the second player 2B is on the opposite side of the screen. The user interface on the display is configured to allow viewers to easily discern what player the score belongs to. For example, in this view, the score on the left side belongs to a player on the corresponding side of the court, while the score on the right belongs to a player on the other corresponding side of the court, as the viewer and players see it. In certain embodiments of team play, the player may have a color assigned to match a team color. Similarly, a player is assigned a background color, which then is shown on the side of the display that is the same as the side of the court that the player is on.

The user interface displays an increase indicator 4 and decrease indicator 3. Upon receipt of a gesture input over the areas defined by the increase indicator 4 or decrease indicator 3, a computer in communication with the user interface causes the game score 2A or 2B to increase or decrease, respectively and records the score update in a memory. The computer may also send score updates to the database. Gesture inputs may be any input received by the computer and display to indicate selection of a particular area of the display screen.

Examples of gesture inputs include, but are not limited to, a touch screen input, a mouse click, pushing a function key or button, an input to a smart watch which is in communication with the computer, direct entry of data. The set win increase indicator 9 and decrease indicator 10 operate similarly, and the computer in communication with the display causes the display to update (increase or decrease) set wins in field 8. In a first embodiment, when the set score is increased, the game scores automatically reset to 0. In another embodiment, the set win field 8 may be automatically updated by the computer which may be programmed to automatically identify when a player score 1, 2 is high enough to constitute a win of a set.

Player names 12 are input, either manually at the time of the game, or pre-loaded on the computer in networked communication with the user interface and/or a remote server (14 of FIG. 1). Similarly, match information 13 can be added remotely or manually. A side switch indicator is positioned, in this embodiment, on the bottom of the screen of the user interface. Upon receipt of a gesture input over the area defined by the side switch indicator, the display is operable to move first player score 2A to the opposite side of the screen, and second player score 2B to the opposite side of the screen, so as to switch their locations. This is helpful when players switch sides of the court at various intervals. A reset button 11 can receive a gesture input to reset all scores. The viewing button 7 causes the scoring system to move to a viewing mode which allows the display screen to be used to view scores of other matches and/or video of other live matches.

Figure 3:
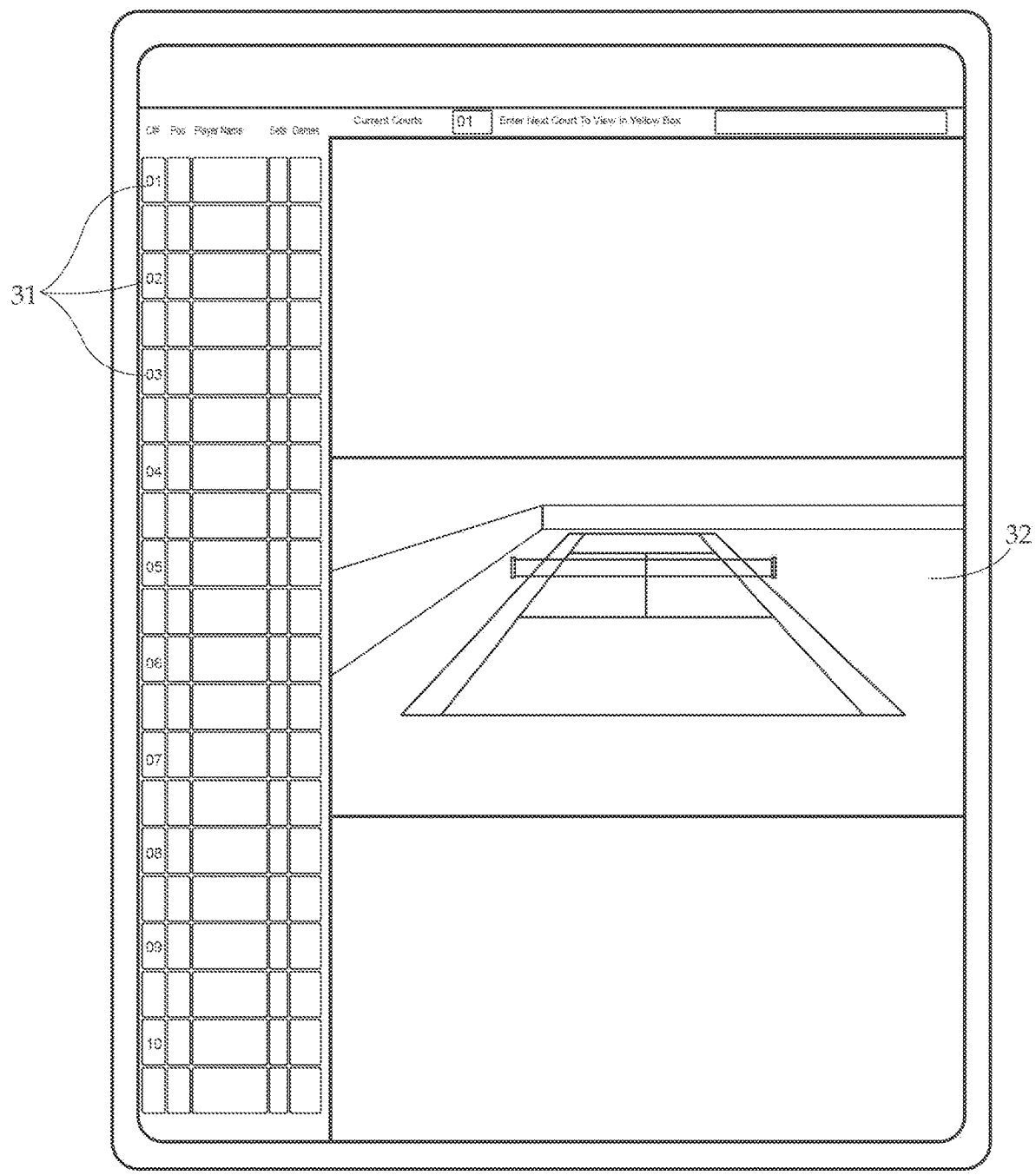
FIG. 3 provides a view of the scoring system user interface in a viewing mode to view scores of other matches and a video of a live match.

FIG. 3 provides a view of an embodiment of the scoring system in a viewing mode to view scores of other matches and a video streaming of a live match. In this view, the display screen covers the game scoring interface of FIG. 2 with the score listing 31 and live video feed 32. The scores listed 31 could be a listing of matches at a particular complex, the complex having multiple courts with multiple scoring system interfaces, one at each court. Or, the scores listed 31 could be at multiple different venues, depending on embodiment. The presentation in this embodiment is performed as an overlay of the plurality of scores over the score interface. In another embodiment, the presentation may overlay only part of the score interface such that some of the scoring interface like that of FIG. 2 remains visible. Overlay may start from the left, right, top, or bottom. In still another embodiment, the presentation of the plurality of scores is performed by shrinking and shifting the display of the scores of the two players so that it takes up only part of the screen, while the scores take up the rest of the screen. In one embodiment, upon receipt of a gesture on a particular score area 31, the live feed corresponding to the match with that score is shown in the live video feed 32. In other embodiments, the score listing 31 and live video feed 32 may partially cover the score view, or the display and computer may be operable to cause the score view to shrink or move to make space for the score listing 31 and/or live video feed 32. Note, in one embodiment only the score associated with the video feed 32 will be displayed.

The live video feed 32 is recorded by a video camera viewing the court and in networked communication with the server (14 of FIG. 1) and presented as a live stream. The video may also be recorded and saved for later viewing. In one embodiment, this camera may be a separate camera mounted near the court in communication with either the computer of the scoring system or in communication with the server. In another embodiment, the camera may be built into the computer of the scoring system, such as an embodiment where the scoring system is implemented on a tablet computer such as an iPad® which are known in the art to have built in cameras. In still further embodiments, multiple cameras may be used to record game play, one or more of which may or may not be built into the scoring system device. In such embodiments, live video 32 may be presented from multiple cameras. Similarly, the score listing 31 of multiple matches is recorded on a scoring system interface, such as a tablet computer or the like, the computer being in networked communication with the server (14 of FIG. 1).

The embodiment illustrated in FIG. 3 also demonstrates one solution to a universal problem with computer systems, namely, a limited availability of viewing or display space on electronic screens. For example, in one embodiment, the viewing mode of FIG. 3 may completely cover the game scoring interface of FIG. 2. The reason for this is that there is limited display space available, so the scoring system cannot simultaneously display the game scoring interface and the viewing mode on the preferred electronic screen. This problem may result in players having to navigate back and forth between the game scoring interface and the viewing mode through various inputs on either interface. This may result in interrupted gameplay, potentially causing players to lose focus. Note, in one embodiment the score and video for a specific court can be displayed on a single screen avoiding the need to go back and forth between two screens.

Similarly, because information for the score listing 31 may only be available from a database and because the video feed 32 may be live streamed directly from a video camera, it would be routine or conventional in the field of computers to have the score listing 31 and the live video feed 32 be displayed on separate user interfaces, which may cause similar problems to those previously described. The present embodiment solves this problem by providing a hybrid user interface simultaneously displaying the score listing 31 and the live video feed 32, so viewers do not need to navigate between separate user interfaces to watch other games. In one embodiment, one of the matches on the score listing 31 may comprise the game scoring interface of FIG. 2, thus allowing viewers to not only keep track of their team's score while simultaneously watching a live video feed 32 of other games, but also watch their team's score be adjusted in real time via a smaller, shrunken, and/or shifted scoring interface.

Figure 4:
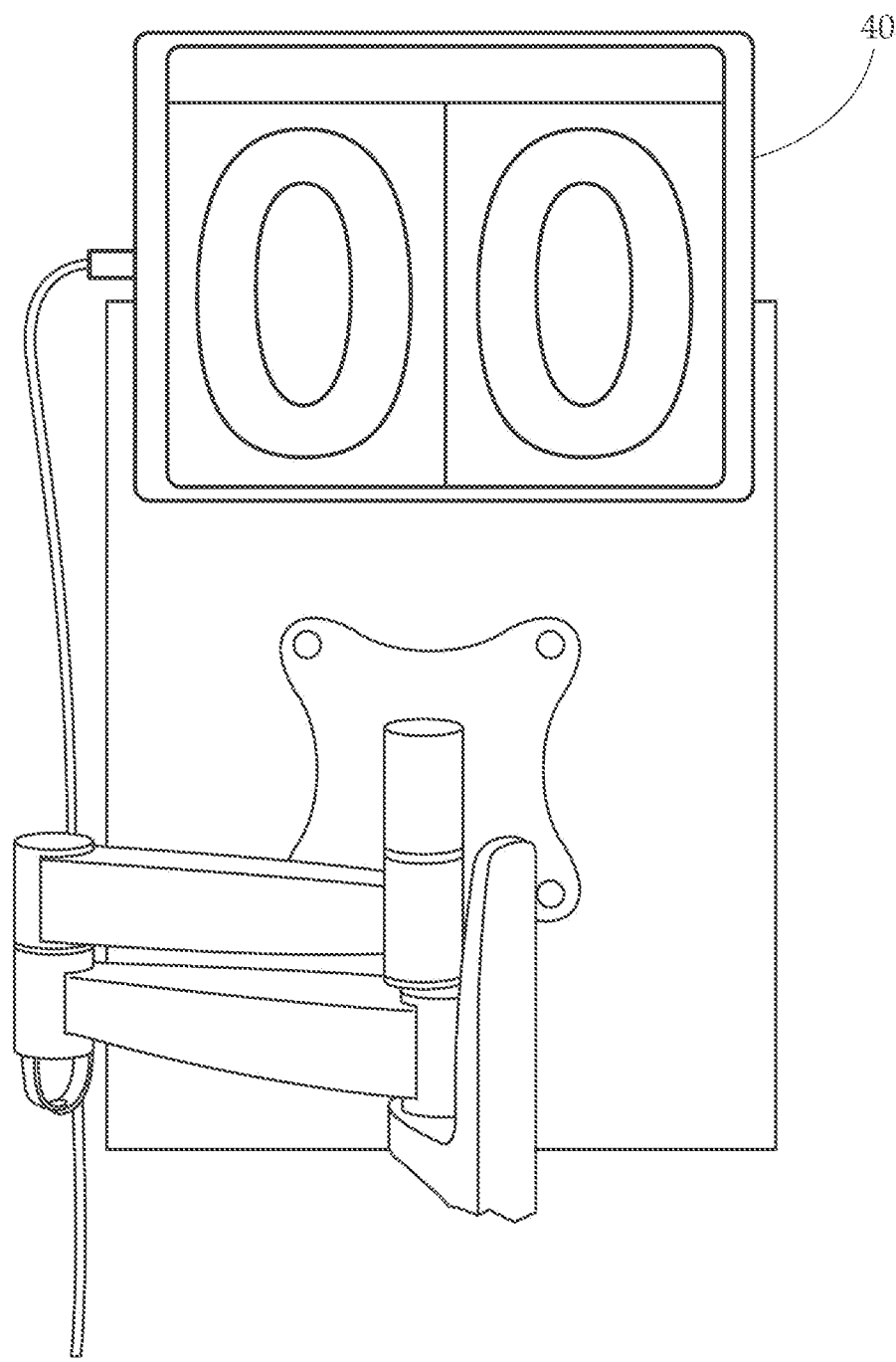
FIG. 4 provides a rear view of an embodiment of the scoring system having a secondary display on a rear.

FIG. 4 provides a view of an embodiment of the scoring system having a rear score display screen. The secondary display screen 40 of this embodiment is physically connected to the scoring system 1 and presents the score of the match being played on a rear of the primary display screen of the scoring system. The data for the display of the score by the secondary display screen 40 may be received via direct connection, wireless networked connection to the computer, or wireless/wired networked connection via the server. In practice, the secondary display screen 40 is positioned, in this view, on a rear of the primary display of the scoring system 1. In most embodiments, the second display screen 40 is positioned facing a direction opposite to the display, and is directed away from the court area. In such an embodiment, the second display screen 40, or a computer providing a signal thereto, is operable to flip the sides of the first and second player relative to the main display screen so that they are opposite to each other and therefore remain on the side of the screen corresponding to the side of the court of a player. This ensures that the player scores are on the same side of the court as the player is playing on. Reversal may be a programmed feature stored on a memory of a computer of the system. As such, in many embodiments, the secondary display screen 40 requires additional programming to ensure that the scores match the player location, rather than mirroring the score of the display screen. This allows the players on the court to view and use the scoring system, while also allowing spectators watching from a side of the court to see the score. The secondary display screen 40 may be any electronic display screen capable of receiving a digital input from a computer. In many embodiments, the secondary display screen 40 may be a tablet computer in communication with one or more of the computer of the scoring system or the server. In the particular embodiment shown, the scoring system display is attached to a holder back which can swivel and move via hinged arms. The secondary screen 40 is mounted on a rear of the holder and may be independently gingerly moveable relative to the scoring system display, or movable about the hinged arms of the holder.

Figure 5:
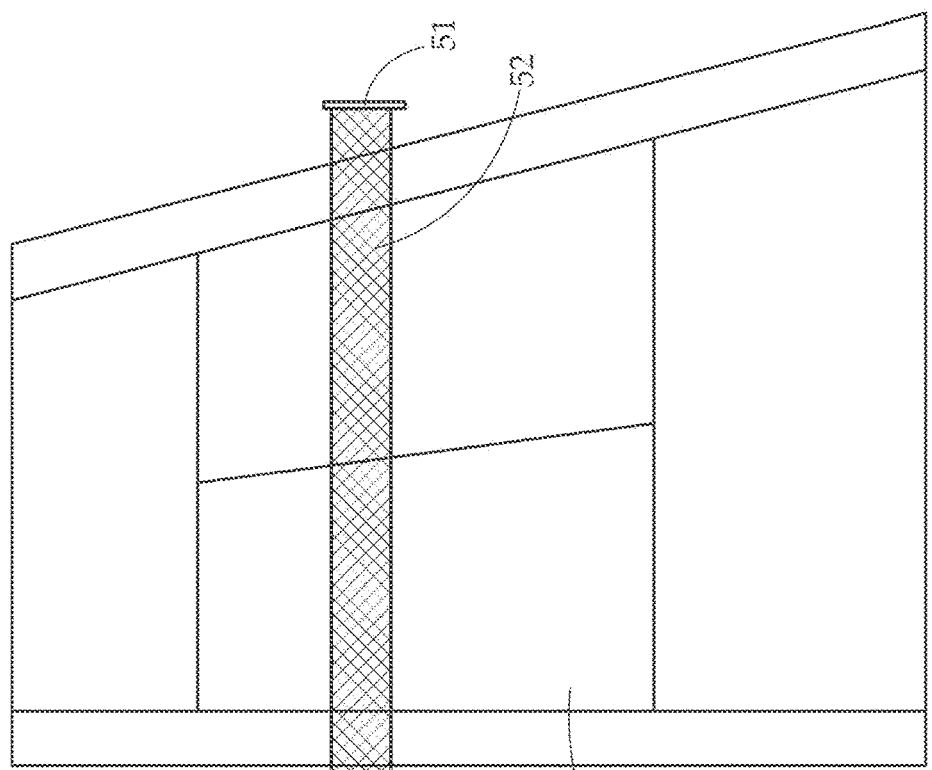
FIG. 5 provides a view of a tennis complex having multiple tennis courts, each of which having an embodiment of the scoring system disclosed.
Figure 5:
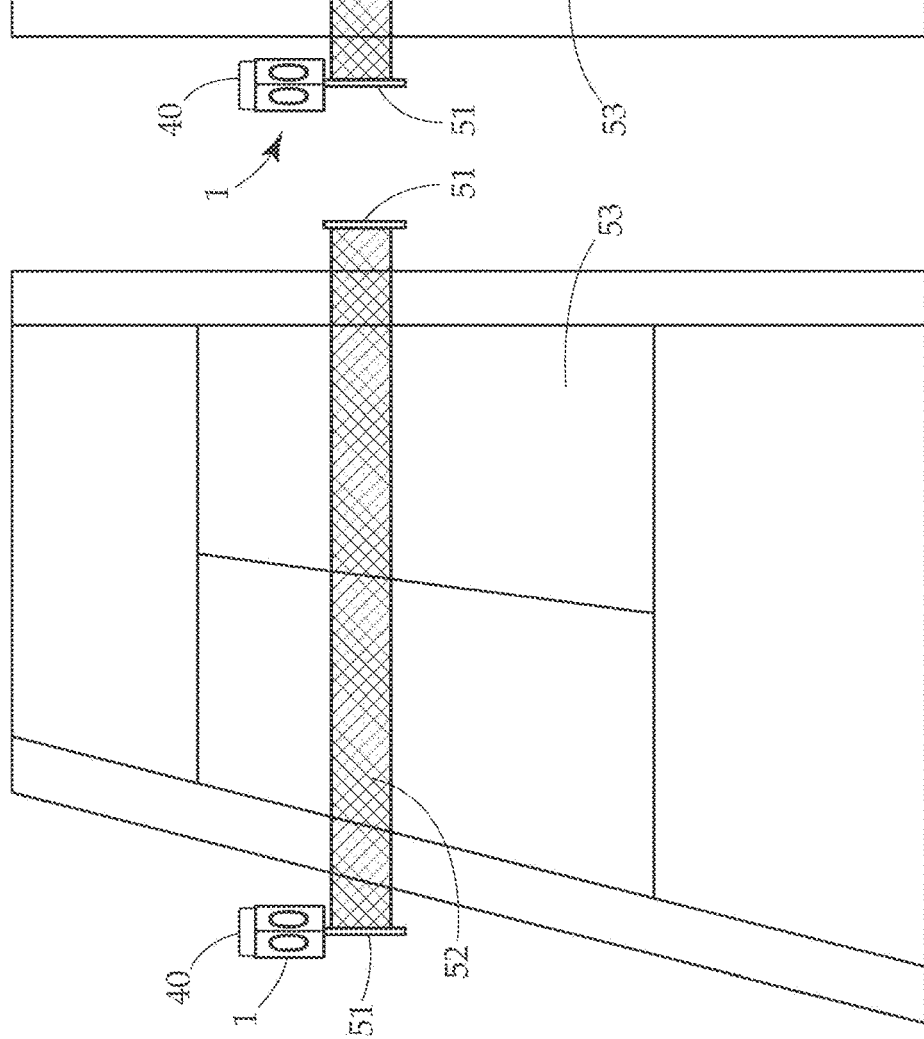

FIG. 5 provides a view of another embodiment of the system. In this view, a tennis complex having multiple tennis courts 53 is provided. Each court 52 has scoring system 1 allowing players to track their scores. Further, each court has a court area 53, with a net 52 supported by two posts 51 spanning at least part of the court area 53. In this embodiment, each scoring system 1 is attached to a post 51 on the court, with two of the posts 51 supporting a net 52. Each scoring system 1 can receive scoring updates and operate as discussed above. Further, a secondary display screen 40 is attached to a rear of the display of the scoring system 1, as discussed with respect to FIG. 4. As can be seen, a spectator on the left side of the courts 53 can see the scores of both matches via the secondary display screens 40, while a spectator on the right side of the courts 53 can view the display screen of the scoring system. The viewing of scores is, again, made even further accessible by the use of the server and remote computer accessibility.

Figure 6:
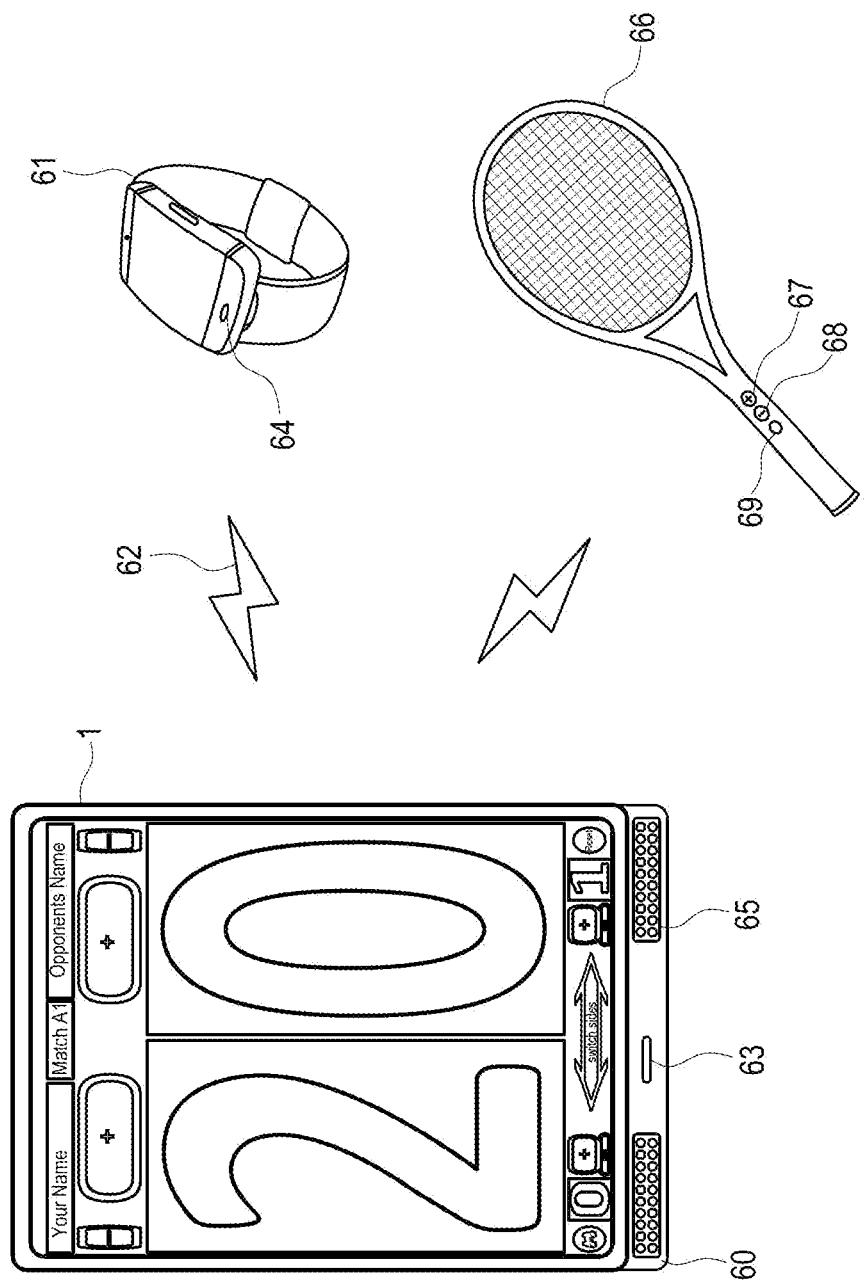
FIG. 6 provides a view of the scoring system user interface in a viewing mode wirelessly connected to one or more electronic devices.

FIG. 6 provides a view of another embodiment of the system. In this embodiment, the scoring system 1 includes or is connected to a device 60 comprising a wireless transceiver, the wireless transceiver operable to connect the scoring system 1 to a computerized device, such as a smart watch 61. The wireless transceiver is configured or operable to connect the scoring system 1 to a smart watch 61 by a short-range, low latency wireless connection 62, such as a Bluetooth® connection. The scoring system 1 or connected device 60 includes a microphone 63 to receive voice inputs from players. Similar to gesture inputs, voice inputs may be any input received by the scoring system display to indicate selection of a particular area of the display screen, such as, for example to increase or decrease a player score. Upon receipt of a voice input by the microphone 63, the scoring system 1 is configured or operable to affect the desired result of said input (e.g., increasing or decreasing a player score). Note, the voice commands used in this embodiment, such as pickle ball, where points are tracked on a very frequent basis, allows the players not to lose focus on the game by being required to go to the device and adjust the scores by touching the screen or otherwise making manual inputs. Also, in this embodiment, the voice commands from players can be directly received by scoring system 1.

In this embodiment, the connected computerized device, which in this case is a smart watch 61, also includes a microphone 64 for the receipt of voice inputs. Upon receipt of a voice input, the computerized device or smart watch 61 is configured or operable to transmit the voice input to the scoring system 1 via the short-range wireless connection 62. The scoring system 1 or connected device 60 may also include one or more speakers 65, enabling the transmission of sound from the system or device. For example, upon the receipt of a direct or wirelessly transmitted input, the system may be configured or operable to audibly confirm receipt of the input, make a statement about the current score, or other similar voice outputs (e.g., transmitting audio from live video feeds, playing music, etc.).

Also in this embodiment, and still referring to FIG. 6, an improved racquet 66 may include or be connected to a device with a transceiver operable to wirelessly connect the racquet 66 to the scoring system 1. Similar to the wireless connection 62 between the scoring system 1 and the smart watch 61, the wireless connection between the scoring system 1 and the electronic racquet 66 or racquet-connected device may facilitate the receipt of wireless inputs for rapid score entry without players needing to leave the court or stop play. Accordingly, the racquet 66 or racquet-connected device may include a plurality of buttons for the receipt of player inputs. The plurality of buttons may include an increase button 67, a decrease button 68, and a reset button 69. The increase button 67, the decrease button 68, and the reset button 69 are configured or operable to increase or decrease a game score on the scoring system, which may then record the score update in a memory. The scoring system may also be configured or operable to send score updates to a database.

Figure 7:
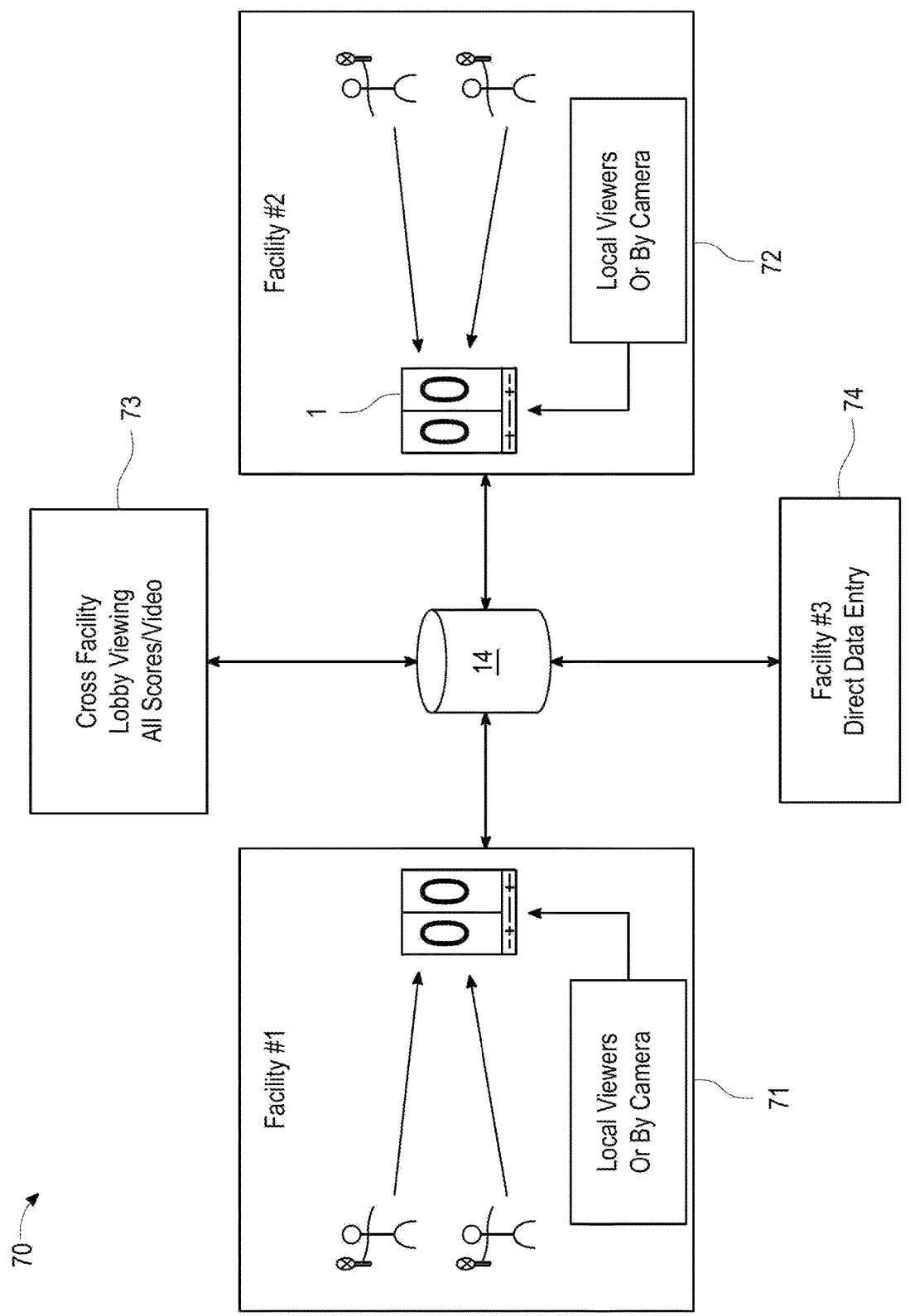
FIG. 7 provides another schematic view of the present invention.

FIG. 7 provides a view of another embodiment of the system. In this embodiment, a centralized database 14 enables the operation of a cross facility score tracking system 70. For example, a first facility 71 and a second facility 72, which both may include any number of courts, local viewers, and/or video cameras, each contain at least one embodiment of the scoring system 1. The scoring systems in both the first facility 71 and the second facility 72 allow visitors or players at one facility with the system to see scores of other teammates or players from another facility with the system as well. The system may accomplish this by receiving inputs related to the exact facility and court numbers and then display the information on an electronic screen or user interface in the form of a cross facility lobby 73 displaying a plurality of scores and/or videos. As the scores are updated, data is sent to the database 14 on a memory of a server which updates the score, recording score information on the database stored on a memory of the server, the server in networked communication with a plurality of scoring systems and other access computers.

The cross facility tracking system 70 also has the ability to receive scores from other matches at other facilities and/or court locations, such as a third facility 74 that does not contain an embodiment of the scoring system 1. This is achieved by the database 14 receiving direct entry of scoring information via a networked connection from the third facility 74. The direct data entry at the third facility 74 may be input into and transmitted from a computerized device, such as a cell phone, tablet, smart watch, and the like. The third facility 74 may not include an embodiment of the scoring system 1 but it may still include a video camera that may stream video data to the database 14. This video data may be accessible in real-time or recorded for later viewing at facilities having at least one embodiment of the scoring system 1, such as the first and second facilities 71, 72.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A computerized racquet-sports scoring system comprising:
   a computer comprising a processor and a memory, a display screen in communication with the processor and the computer operable to:
   receive an input, wherein the input is a gesture input performed over a predetermined area of the display screen marked with an increase indicator; and
   cause the display screen to increase a score displayed corresponding to a first of two players, the increased score displayed on a first side of the display screen, a score of a second of the two players displayed on a second opposite side of the display screen.

2. The racquet-sport scoring system of claim 1 wherein the computer is further operable to receive an input to decrease a score of the first of the two players, wherein the input is a gesture input performed over a predetermined area of the display screen marked with a decrease indicator.

3. The racquet-sport scoring system of claim 2 wherein the computer is further operable to cause the display screen to decrease the score displayed corresponding to the first of the two players.

4. The racquet-sport scoring system of claim 1 wherein the computer is further operable to receive an input to increase a set win field of the first of two players, wherein the input is a gesture input performed over a predetermined area of the display screen marked with a set win increase indicator.

5. The racquet-sport scoring system of claim 4 wherein the computer is further operable to cause the display screen to increase a set win score displayed corresponding to the first of the two players, the set win score positioned on a same side half of the display screen as the score displayed corresponding to the first of the two players.

6. The racquet-sport scoring system of claim 1 wherein the computer is further operable to receive an input to decrease a set win field of the first of two players, wherein the input is a gesture input performed over a predetermined area of the display screen marked with a set win decrease indicator.

7. The racquet-sport scoring system of claim 6 wherein the computer is further operable to cause the display screen to decrease the set win score displayed corresponding to the first of the two players.

8. The racquet-sport scoring system of claim 1 wherein the computer is further operable to receive an input to view scores of other matches being played.

9. The racquet-sport scoring system of claim 8 wherein the computer is further operable to cause the display screen to present a plurality of scores of the other matches being played.

10. The racquet-sport scoring system of claim 9 wherein the presenting of the plurality of scores of the other matches comprises an overlay of the plurality of scores over a part of the score of at least one of the first or the second of the two players.

11. The racquet-sport scoring system of claim 9 wherein the presenting of the plurality of scores of the other matches comprises a shrunken and shifted display of the scores of the two players.

12. The racquet-sport scoring system of claim 1 further comprising a second display in communication with the processor, the second display positioned facing a direction opposite to the display screen.

13. The racquet-sport scoring system of claim 1 wherein the computer is in networked communication with a server, the server operable to record a plurality of scores of at least one of the two players.

14. The racquet-sport scoring system of claim 13 wherein the server is further operable to record a plurality of games won by at least one of the two players and store the scores and games won in a database stored in a memory of the server.

15. The racquet-sport scoring system of claim 13 further comprising a video camera in communication with the computer and the server via the networked communication, the video camera operable to record a game being played.

16. The racquet-sport scoring system of claim 15 wherein the database of the server is accessible by other computers to view scores recorded by the computer, and to view a live video stream recorded by the camera via a networked connection.

\* \* \* \* \*